United States Patent
Fossum et al.

(10) Patent No.: US 6,628,284 B1
(45) Date of Patent: Sep. 30, 2003

(54) METHOD AND APPARATUS FOR PROCESSING GRAPHICS PERSPECTIVE TRANSFORMATIONS

(75) Inventors: Gordon Clyde Fossum, Austin, TX (US); Barry L. Minor, Austin, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 09/656,524

(22) Filed: Sep. 7, 2000

(51) Int. Cl.[7] .............................................. G06T 15/20
(52) U.S. Cl. ...................... 345/427; 345/422
(58) Field of Search ................................. 345/419, 531, 345/427, 421, 422, 502, 581, 643; 382/154; 701/28

(56) References Cited

U.S. PATENT DOCUMENTS

| | | | | |
|---|---|---|---|---|
| 4,855,822 A | * | 8/1989 | Narendra et al. | 701/28 |
| 5,802,202 A | * | 9/1998 | Yamada et al. | 382/154 |
| 6,348,918 B1 | * | 2/2002 | Szeliski et al. | 345/419 |
| 6,377,268 B1 | * | 4/2002 | Jeddeloh | 345/531 |

* cited by examiner

*Primary Examiner*—Mano Padmanabhan
(74) *Attorney, Agent, or Firm*—Duke W. Yee; Mark E. McBurney; Lisa L. B. Yociss

(57) ABSTRACT

A method and apparatus in a data processing system for processing perspective transformations. An estimate of a depth coordinate is obtained. A determination is made as to whether the estimate is sufficiently accurate for the perspective transformation. An algebraic operation is performed on the estimate if the estimate is insufficiently accurate for the perspective transformation, wherein the algebraic operation increases the accuracy of the estimate.

16 Claims, 3 Drawing Sheets

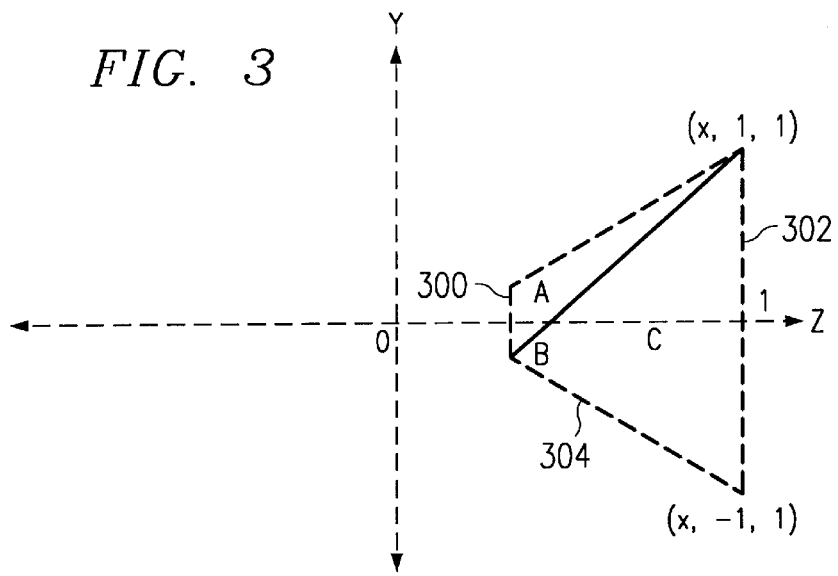
FIG. 3
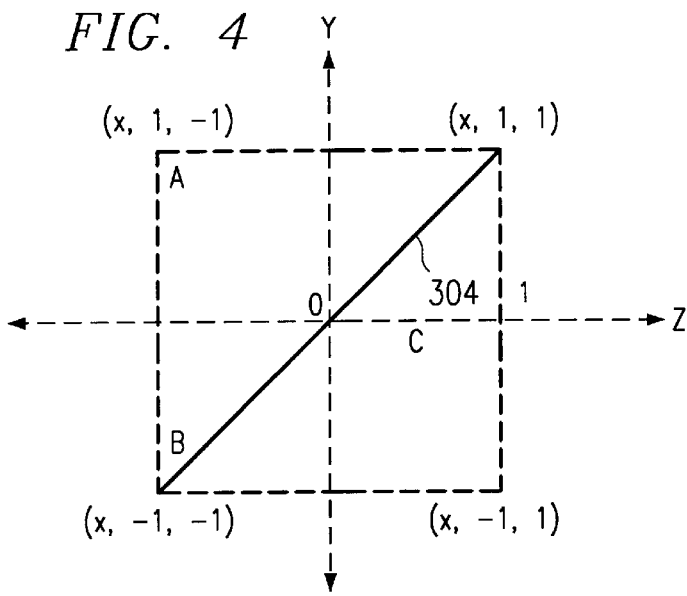
FIG. 4
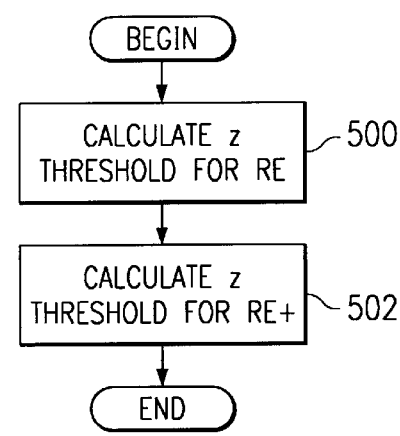
FIG. 5
FIG. 7
COMPUTE THE THRESHOLDS:
WHEN THE PERSPECTIVE TRANSFORM CHANGES, DO THESE TWO THINGS:
  COMPUTE T0 FROM THE B ASSOCIATED WITH "RE".
  COMPUTE T1 FROM THE B ASSOCIATED WITH "RE+".

USE THE THRESHOLDS IN COMPUTATIONS:
FOR EVERY VERTEX PROCESSED:
  SEND VERTEX THROUGH PERPESCTIVE TRANSFORM, YIELDING (x, y, z, w)
  IF (z<(T0*w))
    THEN ESTIMATE 1/w WITH "RE" ALONE.
  ELSE IF (z<(T1*w))
    THEN ESTIMATE 1/w WITH "RE+".
    ELSE ESTIMATE 1/w WITH "RE++" OR SIMPLY DO THE DIVISION.
    EndIf
  EndIf
EndFor

METHOD AND APPARATUS FOR PROCESSING GRAPHICS PERSPECTIVE TRANSFORMATIONS

BACKGROUND OF THE INVENTION

1. Technical Field:

The present invention relates generally to an improved data processing system, and in particular to a method and apparatus for processing graphics data. Still more particularly, the present invention relates generally to a method and apparatus for performing graphics perspective transformations on graphics data.

2. Description of Related Art:

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, a triangle, a polygon, or a quadrilateral. A primitive is defined by a group of one or more vertices. A vertex defines a point, an end point of an edge, or a corner of a polygon where two edges meet. Data also is associated with a vertex in which the data includes information, such as positional coordinates, colors, normals, and texture coordinates. Commands are sent to the graphics system to define how the primitives and other data should be processed for display.

Typical graphics implementations offer two types of "views". One is orthographic, in which all parallel lines appear parallel on the screen, lending a somewhat unreal flavor to the scene. The "perspective" view is often preferred, because it more closely mimics what the viewer would see if viewing the object through a real "window". In this view, there is a "near plane" and a "far plane" each at a certain distance from the viewpoint. These distances are referred to as "znear" and "zfar" respectively. This perspective view involves the non-trivial use of four-dimensional coordinates, to help "warp" the viewing frustum into a cube for proper rendering. The crux of this "warp" operation is the act of dividing the x, y, and z coordinates by the "w" coordinate. Most implementations of perspective transformations compute 1/w and then multiply by this number three times, meaning that only one expensive divide operation needs to be done. The floating point divide operation, however, remains a very complex task, using anywhere from 20 to 80 cycles of processor resources per vertex.

Therefore, it would be advantageous to have an improved method and apparatus for performing perspective transformations.

SUMMARY OF THE INVENTION

The present invention provides a method and apparatus in a data processing system for processing perspective transformations. An estimate of a depth coordinate is obtained. A determination is made as to whether the estimate is sufficiently accurate for the perspective transformation. An algebraic operation is performed on the estimate if the estimate is insufficiently accurate for the perspective transformation, wherein the algebraic operation increases the accuracy of the estimate.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a graph illustrating a canonical perspective viewing frustum from a side view in accordance with a preferred embodiment of the present invention;

FIG. 4 is a graph illustrating a side view of a normalized device coordinates (NDC) cube in accordance with a preferred embodiment of the present invention;

FIG. 5 is a flowchart of a process used for computing thresholds in accordance with a preferred embodiment of the present invention;

FIG. 7 is pseudo-code illustrating computation of thresholds in accordance with a preferred embodiment of the present invention.

DETAILED DESCRIPTION OF THE PREFERRED EMBODIMENT

Figure 1:
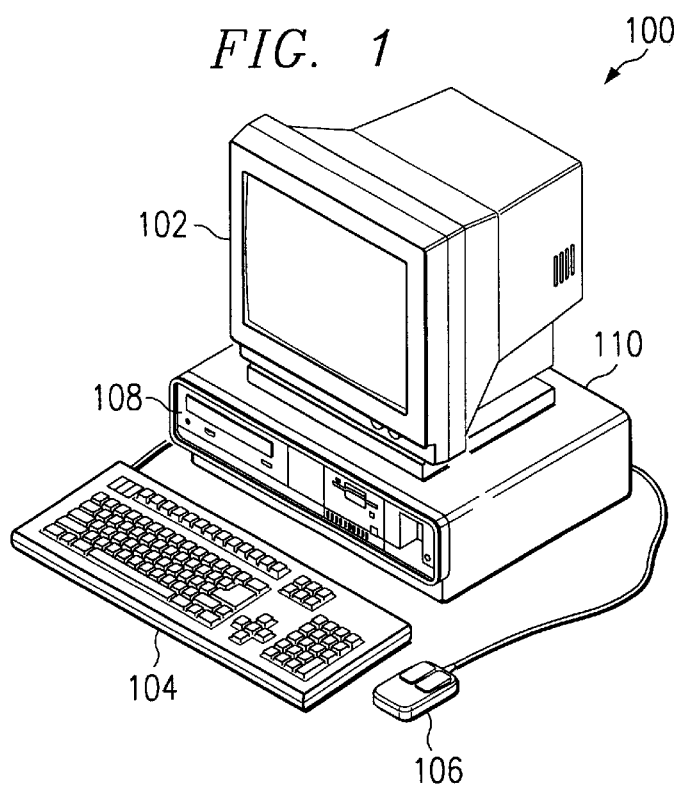
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
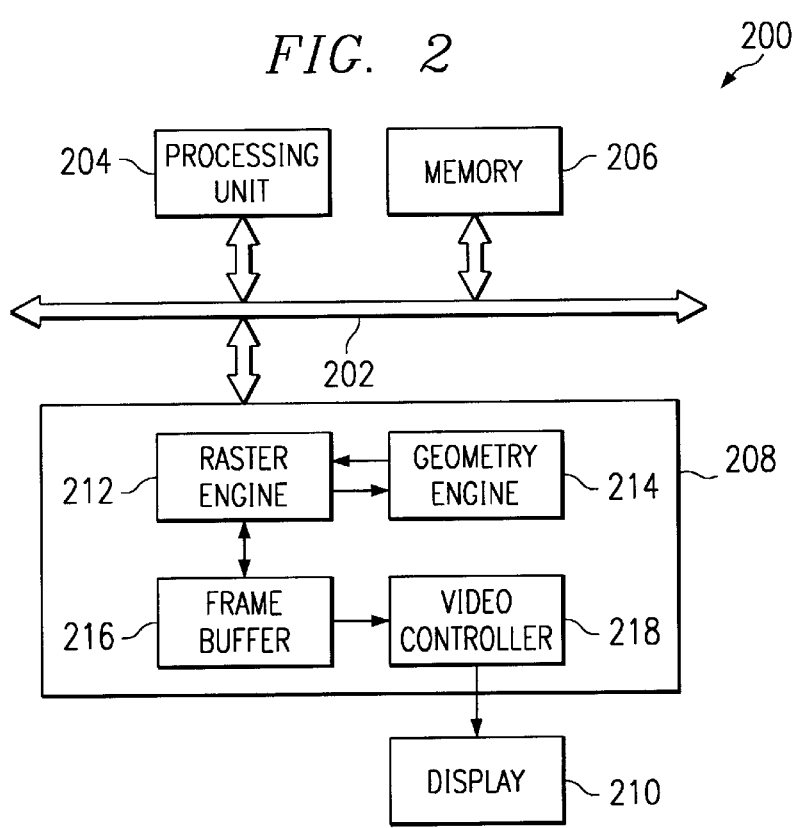
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 is an example of components used in a data processing system, such as computer 100 in FIG.

1. Data processing system 200 employs a bus 202 in the form of a peripheral component interconnect (PCI) local bus architecture. Although the depicted example employs a PCI bus, other bus architectures such as Accelerated Graphics Port (AGP) and Industry Standard Architecture (ISA) may be used. Processing unit 204, memory 206, and graphics adapter 208 are connected to bus 202 in these examples. Processing unit 204 includes one or more microprocessors in the depicted example.

Graphics adapter 208, in this example, processes graphics data for display on display device 210. The graphics data is received from applications executed by processing unit 204. Graphics adapter 208 includes a raster engine 212, a geometry engine 214, a frame buffer 216, and a video controller 218. Raster engine 212 receives the graphics data from the application. In these examples, raster engine 212 contains the hardware and/or software used to rasterize an image for display. Raster engine 212 is used to turn text and images into a matrix of pixels to form a bitmap for display on a screen. In the depicted example, raster engine 212 sends the received graphics data to geometry engine 214, which provides the functions for processing primitives and other graphics data to generate an image for raster engine 212 to process. The processed data is then passed back to raster engine 212. The mechanisms of the present invention can be located either in the host processor or in the geometry engine, as they can be implemented in software or in hardware.

Frame buffer 216 is an area of memory used to hold a frame of data. Frame buffer 216 is typically used for screen display and is the size of the maximum image area on the screen. Frame buffer 216 forms a separate memory bank on graphics adapter 208 to hold a bit map image while it is "painted" on a screen. Video controller 218 takes the data in frame buffer 216 and generates a display on display 210. Typically, video controller 218 will cycle through frame buffer 216 one scan line at a time.

Turning next to FIG. 3, a graph illustrating a canonical perspective viewing frustum from a side view is depicted in accordance with a preferred embodiment of the present invention. In FIG. 3, the near plane is defined through vertical line 300 between points A and B The far plane is defined through line 302 between points (x,1,1) and (x,-1,1). The point C can be seen to be slightly closer to the near plane than the far plane. However, a straight line 304 drawn from point B to point (x,1,1) would pass to the left of point C, and line 304, after transformation will remain a straight line, and will therefore pass through the origin in FIG. 4 below.

Turning next to FIG. 4, a graph illustrating a side view of a normalized device coordinates (NDC) cube is depicted in accordance with a preferred embodiment of the present invention. In this figure, the points A and B have moved to their new positions along the plane z=-1. The point C shows up as being closer to the far plane, as a result of the fact that the line connecting point B with (x,1,1) crosses the z axis significantly to the left of point C.

FIGS. 3 and 4 provide a more detailed description of the problem involved with perspective transformations solved by the present invention. Everything close to the back of the viewing frustum gets smashed to the right hand side of the NDC cube, thus causing a possibility of assigning unacceptably large chunks of the depth range into the same z buffer values.

When rendering an image, it has been traditional for years to use a "depth buffer" or "Z-buffer" to determine which surfaces are visible to the viewer and which are hidden. The Z-buffer traditionally holds 24-bit values for each pixel, encoding the "depth" of that pixel in the scene. In orthographic projections, these 16,777,216 values are equally distributed throughout the rendering space created by the user. In perspective projections, unfortunately, this is not the case. The operation of dividing by "w" (while good for creating pleasing and intuitive displays on the screen) causes an effect called "bunching".

The formula for determining the value of z after the perspective transform is:

$$PT(z)=(1+n)/(1-n)-2n/(z*(1-n))$$

Where n is the ratio (znear/zfar), and where the input z has been scaled by zfar, meaning, in essence, the scene is scaled so zfar=1.

If a point is (1) selected on the z axis exactly half-way between the near clipping plane and the far clipping plane (z=(n+1)/2), (2) the point is placed into the above formula in place of "z", and (3) simplified, the corresponding point after transformation will be placed at z=(1−n)/(1+n). Thus, as n gets small, it can be seen that half of the viewing frustum is compressed into a very small space near the far end of the NDC cube. This "compression" can be quantified, as follows:

Let f be the distance between the front of the normalized device coordinates (NDC) cube and this z. Let b be the distance between the back of the NDC cube and this z. Then, the ratio b/f (that is, the ratio between the space allocated for the back half of the frustum and the front half of the frustum) is $$\frac{1-((1-n)/(1+n))}{((1-n)/(1+n))-(-1)}$$

multiply by (1+n) in every term:

$$\frac{(1+n)-(1-n)}{(1-n)+(1+n)}=\frac{2n}{2}=n.$$

Thus, the space allocated to the back half is small relative to the space allocated to the front half, and the ratio is exactly the ratio between the near and far clipping planes.

If you consider the effect this has on the NDC z values when they are reverse-mapped back into the space of the viewing frustum, the available z values in the scene are crowded toward the "front" of the scene, so that the front of the viewing frustum is populated with a denser concentration of z values than is the back of the frustum. Since the available z values toward the back of the image are sparse, the unfortunate situation is present where objects which touch the same pixel, and are close in depth, will share the same z-buffer code value. This situation means that it is no longer possible to distinguish which one is "in front" and we display unpleasant images where apparently random pixels of a "hidden" object actually appear "in front" of the object which hides them. This result is unacceptable. The severity of the problem is a function of the ratio between the distance to the far clipping plane divided by the distance to the near clipping plane. Users are constantly advised to keep the near clipping plane as far from the eye as possible, but they often don't listen, and the industry has responded by creating systems with 32-bit depth buffers to try to ameliorate the problem.

This is an expensive solution, and can be avoided by a combination of proper placement of the front clipping plane and the present invention. The present invention provides a method, apparatus, and computer implemented instructions for processing perspective transformations using and increasing the accuracy of estimations for w. The mechanism of the present invention uses a reciprocal estimate instruction to obtain an approximation or estimate of a number. Most modern microprocessors contain a machine instruction which takes one floating-point number and returns an approximation to its reciprocal. This estimate of the multiplicative inverse is guaranteed to be accurate to some stated max error, like one part in 256, or one part in 4096. This instruction is much faster than doing a floating point divide, but often of insufficient quality for use in graphics rendering.

The present invention, however, recognizes that algebraic methods for improving such estimates exist that may be applied to this type of data, and that these methods are still more efficient than performing a full floating-point division. These algebraic methods for improving estimates are used to generate a reciprocal for w for use in processing perspective transformations.

In the depicted examples, one such method used is called the Newton-Raphson method. This method is known to drastically improve estimates of roots of functions with relatively little computation and is excellent for use in improving the results for the function 1/x. In fact, each iteration of the Newton-Raphson method will double the number of significant and accurate bits of the estimate. Thus, if the original inverse estimate is good to one part in 256($1/(2^{}8)$), one iteration of Newton-Raphson will improve the estimate to one part in 65536 ($1/(2^{}16)$), and a second iteration will improve it to one part in 4 billion ($1/(2^{**}32)$) Thus, it becomes important to know how many bits of accuracy are "enough" for a given image being rendered, so that the number of iterations of Newton-Raphson needed can be identified, given the accuracy of the initial inverse estimate. It is also important to execute as few iterations as possible because, while the computations are simple, they represent a sequence of operations, each of which is dependent on the result of its predecessor, making them inefficient on modern pipelined processor architectures. The operation of generating an initial reciprocal estimate is referred to as RE and the operation of concatenating that with one or two iterations of Newton-Raphson is referred to as RE+ or RE++, respectively.

Since performing a full floating point divide is considered undesirable because of its computational expense, the mechanism of the present invention uses an inverse estimate instruction with zero or more iterations of Newton-Raphson, yielding a result that is considered sufficient for use in computer graphics rendering. The number of iterations will depend on the desired accuracy for the estimate. The decision process, in these examples, involves five variables:

R: the desired resolution in eye coordinates (e.g. $1/(2^{**}12)$)

D: the accuracy of the z buffer encoding (e.g. $1/(2^{**}24)$)

B: the accuracy yielded by the RE method ("RE" or "RE+" or "RE++").

z: the depth of the vertex (z_near<=z <=z_far) and n: the ratio z_near/z_far (some number less than 1.0). Consider two vertices in eye coordinates, whose z values differ by at least R. It is desired to ensure that after the perspective divide (using a somewhat inaccurate w value, generated by RE, RE+or RE++), the post-transform z values will be distinct (cannot fall into the same slot in the z buffer). If two z values, z and z+R are present then, the goal is to ensure that $$(PT(z+R)-B)-(PT(z)+B)>(2.0*D)$$

where PT(z) is the "perspective transform" operation, converting z from eye coordinates to device coordinates. This means that if the errors are as bad as they can get, a guard band is still present between the computed values, which are equal to the range of the real line represented by any given z buffer value. Note that since the range of Z after the perspective divide is [−1.0, 1.0], (2.0*D) is present instead of D. The error in the computation resulting from our use of RE, RE+ or RE++ can be as much as B, so that the resulting value can be anywhere in [PT(z)−B, PT(z)+B].

The definition of PT(z) is as follows:

$$PT(z)=(1+n)/(1-n)-2n/(z*(1-n))$$

note that if z is at the near plane (z=n), then PT(z) is −1.0.

if z is at the far plane (z=1.0), then PT(z) is 1.0.

Substituting this definition of PT(z) into the previous inequality yields:

$$\left(\frac{1+n}{1-n}-\frac{2n}{(z+R)*(1-n)}-B\right)-\left(\frac{1+n}{1-n}-\frac{2n}{z*(1-n)}+B\right)>2.0*D$$

Cancel the (1+n)/(1−n) terms:

$$\left(-\frac{2n}{(z+R)*(1-n)}-B\right)-\left(-\frac{2n}{z*(1-n)}+B\right)>2.0*D$$

Rearrange terms, and move the B's to the right side:

$$\frac{2n}{z*(1-n)}-\frac{2n}{(x+R)*(1-n)}>2.0*D+2B$$

Divide all terms by 2:

$$\frac{n}{z*(1-n)}-\frac{n}{(z+R)*(1-n)}>D+B$$

Establish common denominator:

$$\frac{(z+R)*n-z*n}{z*(z+R)*(1-n)}>D+B$$

Multiply by (1−n) and simplify numerator:

$$\frac{R*n}{z*(z+R)}>(D+B)*(1-n)$$

Multiply by $z*(z+R)$, divide by $(D+B)*(1-n)$, and swap sides of inequality:

$$z*(z+R) < \frac{R*n}{(D+B)*(1-n)}$$

Erring slightly on the conservative side, we drop the R from the left hand side and take the square root, yielding $$z < \text{sqrt}(R*n/((D+B)*(1-n))).$$

Thus, for any given R, D, B and n, a threshold value for the z variable may be computed. If the z value is below this threshold, the chosen R, D, B and n will yield satisfactory results. If the z value is above this computed threshold, an unpleasant "bleedthrough" of hidden objects may occur. So, if a given implementation has, say, an RE which will give an estimate good to one part in 28, a threshold T0 and a threshold T1 may be precomputed. The threshold T0 is the z threshold for B=(1.0)/(28), corresponding to RE. The threshold T1 is the z threshold for B=(1.0)/(2**16), corresponding to RE+. Given a z value and its corresponding w value:

if (z<(T0*w)) use RE alone to estimate (1w)
else, if (z<(T1*w)), use RE+ to estimate (1/w)
else, use RE++ or just perform the full computer reciprocal.

The values D, B, and R are constants, chosen once for a given implementation. The value n needs to be computed only when the user-specified projection matrix changes. The implementation may choose to run this computation only once for the maximum z value of a bounding box for an object, greatly reducing the computational burden.

This ability to precompute a threshold and use an efficient comparison to avoid unnecessary iterations of Newton-Raphson is an important feature of the present invention.

Turning next to FIG. 5, a flowchart of a process used for computing thresholds is depicted in accordance with a preferred embodiment of the present invention.

The process begins by calculating the z threshold for RE (step 500). Next, the z threshold is calculated for RE+ (step 502) with the process terminating thereafter.

Figures 6, 8:
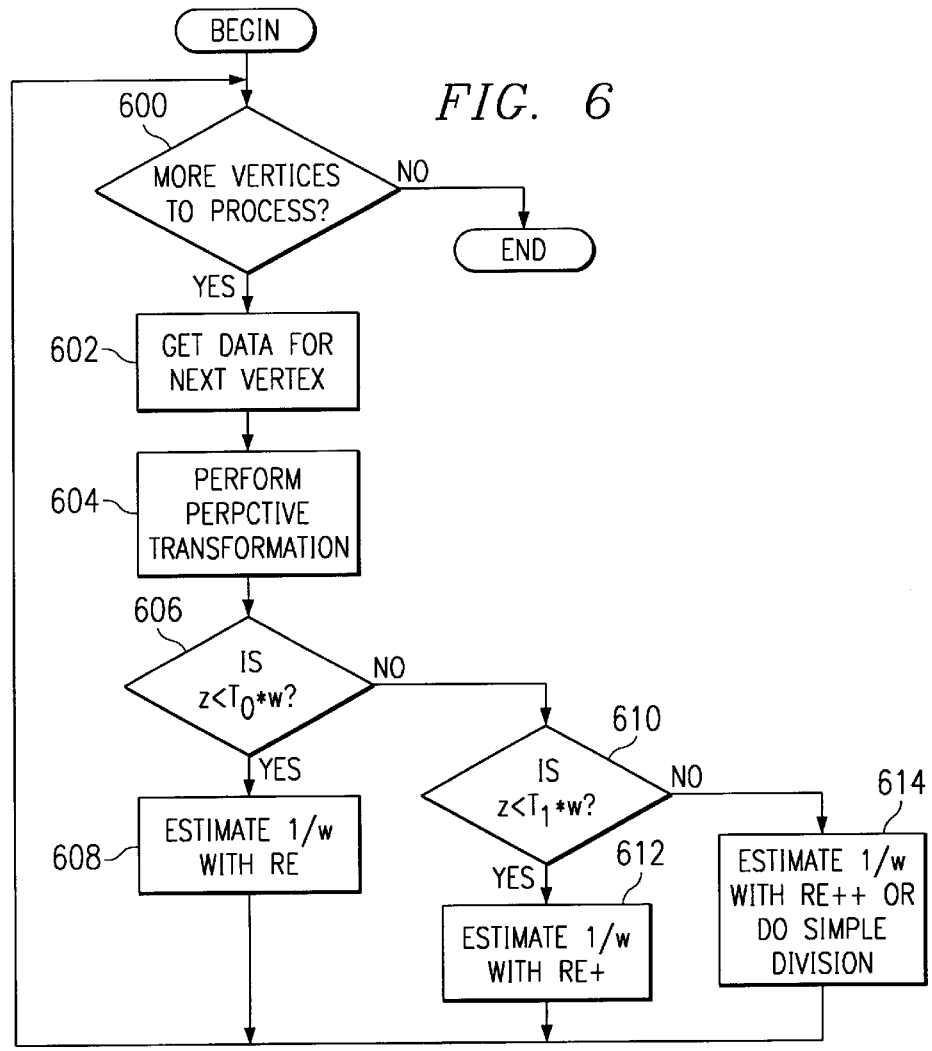
FIG. 6 is a flowchart of a process used for using thresholds in processing graphics perspective transformations in accordance with a preferred embodiment of the present invention.
FIG. 8 is pseudo-code illustrating the use of computed thresholds and perspective transformations in accordance with a preferred embodiment of the present invention.

Turning next to FIG. 6, a flowchart of a process used for using thresholds in processing graphics perspective transformations is depicted in accordance with a preferred embodiment of the present invention.

The process begins by determining whether there are more vertices to process (step 600). If there are no more vertices to process, the process ends. If there are more vertices to process, the data is retrieved for the next vertex (step 602). Next, the perspective transformation is performed (step 604). A determination is then made as to whether z is less than T0 multiplied by w. If z is less than TO multiplied by w, 1 divided by w is estimated with RE (step 608) with the process returning to step 600.

With reference again to step.606, if z is not less than T0 multiplied by w, a determination is made as to whether z is less than T1 multiplied by w (step 610). If z is less than T1 multiplied by w, 1 divided by w is estimated with RE+ (step 612) with the process returning to step 600.

With reference again to step 610, z is not less than T1 multiplied by w, 1 divided by w is estimated with RE++ or simple division is performed (step 614) with the process returning to step 600.

Turning next to FIG. 7, pseudo-code illustrating computation of thresholds is depicted in accordance with a preferred embodiment of the present invention.

Turning next to FIG. 8, pseudo-code illustrating using computed thresholds and perspective transformations is depicted in accordance with a preferred embodiment of the present invention. Thus, the present invention provides a method, apparatus, and computer implemented instructions for performing perspective transformations in which estimations of the reciprocal of w are improved upon by using algebraic methods to increase the accuracy of the estimate. The mechanism of the present invention also determines how many times an algebraic method is to be performed to provide sufficient accuracy in the estimate for use in performing the perspective transformation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although in the depicted examples, the algebraic method used to increase the accuracy of an estimate is the Newton-Raphson method, other algebraic methods for increasing the accuracy of an estimate may be used. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing perspective transformations, the method comprising:

obtaining an estimate of a warp coordinate used for warping coordinates during perspective transformations;

determining whether an accuracy of the estimate is sufficiently accurate for a perspective transformation by comparing a depth coordinate to a threshold that was determined utilizing the accuracy of the estimate, the accuracy of the estimate being identified as follows:

z<sqrt(R*n/(D+B*(1-n))), wherein z is a depth of a vertex, R is a desired resolution in eye coordinates, D is an accuracy of a z buffer encoding, B is an accuracy yielded by an algebraic operation, and n is a ratio of a near depth value and a far depth value;

in response to a determination that the depth coordinate is above the threshold, determining that the estimate of the warp coordinate is insufficiently accurate; and performing an algebraic operation on the estimate if the accuracy of the estimate is insufficiently accurate for the perspective transformation, wherein the algebraic operation increases the accuracy of the estimate.

2. The method of claim 1, wherein the algebraic operation performed is a Newton-Raphson method.

3. The method of claim 1 further comprising:
performing the perspective transformation without performing the algebraic operation if the estimate is sufficiently accurate.

4. The method of claim 1 further comprising:
performing the perspective transformation after the algebraic operation increases the accuracy of the estimate to a point sufficiently accurate for the perspective transformation.

5. The method according to claim 1, further comprising the steps of:
in response to a determination that the depth coordinate is above the threshold, performing the algebraic operation on the estimate to produce a second estimate;
determining whether an accuracy of the second estimate is sufficiently accurate for a perspective transformation by comparing the depth coordinate to a second threshold that was determined utilizing the second estimate;
in response to a determination that the depth coordinate is above the second threshold, determining that the second estimate of the warp coordinate is insufficiently accurate; and
performing an algebraic operation on the second estimate if the accuracy of the second estimate is insufficiently accurate for the perspective transformation, wherein the algebraic operation increases the accuracy of the second estimate.

6. The method according to claim 5, further comprising the steps of:
in response to a determination that the depth coordinate is between the threshold and the second threshold, determining that the second estimate of the warp coordinate is sufficiently accurate; and
utilizing the second estimate for the perspective transformation.

7. The method of claim 5, further comprising the steps of:
wherein the second threshold is the square root of $(R*n/(D+B*(1-n)))$, wherein R is a desired resolution in eye coordinates, D is an accuracy of a z buffer encoding, B is an accuracy yielded by an algebraic operation used to estimate the second estimate of the warp coordinate, and n is a ratio of a near depth value and a far depth value.

8. The method according to claim 1, further comprising the steps of:
in response to a determination that the depth coordinate is below the threshold, determining that the estimate of the warp coordinate is sufficiently accurate; and
utilizing the estimate for the perspective transformation.

9. The method of claim 1, further comprising the steps of:
wherein the threshold is the square root of $(R*n/(D+B*(1-n)))$, wherein R is a desired resolution in eye coordinates, D is an accuracy of a z buffer encoding, B is an accuracy yielded by an algebraic operation used to estimate the estimate of the warp coordinate, and n is a ratio of a near depth value and a far depth value.

10. A data processing system for processing perspective transformations, the data processing system comprising:
obtaining means for obtaining an estimate of a warp coordinate used for warping coordinates during perspective transformations;
determining means for determining whether an accuracy of the estimate is sufficiently accurate for a perspective transformation by comparing a depth coordinate to a threshold that was determined utilizing the accuracy of the estimate, the accuracy of the estimate being identified as follows:
$z<sqrt(R*n/(D+B*(1-n)))$ means for $z<sqrt(R*n/(D+B*(1-n)))$, wherein z is a depth of a vertex, R is a desired resolution in eye coordinates, D is an accuracy of a z buffer encoding, B is an accuracy yielded by an algebraic operation, and n is a ratio of a near depth value and a far depth value;
in response to a determination that the depth coordinate is above the threshold, determining means for determining that the estimate of the warp coordinate is insufficiently accurate; and
performing means for performing an algebraic operation on the estimate if the accuracy of the estimate is insufficiently accurate for the perspective transformation, wherein the algebraic operation increases the accuracy of the estimate.

11. The data processing system of claim 10, wherein the algebraic operation performed is a Newton-Raphson method.

12. The data processing system of claim 10 further comprising:
performing means for performing the perspective transformation without performing the algebraic operation if the estimate is sufficiently accurate.

13. The data processing system of claim 10 further comprising:
performing means for performing the perspective transformation after the algebraic operation increases the accuracy of the estimate to a point sufficiently accurate for the perspective transformation.

14. The system according to claim 10, further comprising:
in response to a determination that the depth coordinate is above the threshold, performing means for performing the algebraic operation on the estimate to produce a second estimate;
determining means for determining whether an accuracy of the second estimate is sufficiently accurate for a perspective transformation by comparing the depth coordinate to a second threshold that was determined utilizing the second estimate;
in response to a determination that the depth coordinate is above the second threshold, determining means for determining that the second estimate of the warp coordinate is insufficiently accurate; and
performing means for performing an algebraic operation on the second estimate if the accuracy of the second estimate is insufficiently accurate for the perspective transformation, wherein the algebraic operation increases the accuracy of the second estimate.

15. The system according to claim 14, further comprising:
in response to a determination that the depth coordinate is between the threshold and the second threshold, determining means for determining that the second estimate of the warp coordinate is sufficiently accurate; and
utilizing means for utilizing the second estimate for the perspective transformation.

16. A computer program product in a computer readable medium for use in a data processing system for processing perspective transformations, the computer program product comprising:
first instructions for obtaining an estimate of a warp coordinate used for warping coordinates during perspective transformations;

second instructions for determining whether an accuracy of the estimate is sufficiently accurate for a perspective transformation by comparing a depth coordinate to a threshold that was determined utilizing the accuracy of the estimate, the accuracy of the estimate being identified as follows:

$z<sqrt(R*n(D+B*(1-n)))$ means for $z<sqrt(R*n/(D+B*(1-n)))$, wherein z is a depth of a vertex, R is a desired resolution in eye coordinates, D is an accuracy of a z buffer encoding, B is an accuracy yielded by an algebraic operation, and n is a ratio of a near depth value and a far depth value;

third instructions for performing an algebraic operation on the estimate if the accuracy of the estimate is insufficiently accurate for the perspective transformation, wherein the algebraic operation increases the accuracy of the estimate.

* * * * *